United States Patent [19]

Simmons et al.

[11] Patent Number: 5,101,082

[45] Date of Patent: Mar. 31, 1992

[54] ELECTRIC POWER CORD TAKE-UP REEL WITH AUTOMATICALLY OPERATED LATCH PAWL ACTUATED SWITCHING MECHANISM

[75] Inventors: Louis P. Simmons, Valparasio; John A. Stuhlmacher, Crown Point, both of Ind.

[73] Assignee: McGill Manufacturing Company, Inc., Valparaiso, Ind.

[21] Appl. No.: 552,235

[22] Filed: Jul. 12, 1990

[51] Int. Cl.$^5$ .............................................. H02G 11/02
[52] U.S. Cl. ............................... 191/12.2 R; 200/61.15
[58] Field of Search ........... 191/12 R, 12.2 R, 12.2 A, 191/12.4; 200/61.15, 61.16

[56] References Cited

U.S. PATENT DOCUMENTS

| | | | |
|---|---|---|---|
| 2,453,407 | 11/1948 | Burns | 191/12.2 R |
| 2,565,452 | 8/1951 | Johnson et al. | 191/12.2 R |
| 2,745,912 | 5/1956 | Meyer. | |
| 2,781,456 | 2/1957 | Buckeridge | 191/12.2 A X |
| 3,039,717 | 6/1962 | Appleton. | |
| 3,065,925 | 11/1962 | Appleton. | |
| 3,904,843 | 9/1975 | Kendechy | 200/61.15 X |
| 4,154,324 | 5/1979 | Upton et al. | 191/12.2 R |
| 4,300,665 | 11/1981 | Arechaga | 191/12.4 |
| 4,350,850 | 9/1982 | Kovacik et al. | 191/12.2 R |
| 4,489,223 | 12/1984 | Puckett et al. | 191/12.2 R |

FOREIGN PATENT DOCUMENTS

0254087  2/1988  German Democratic Rep. ............... 191/12.2 R

Primary Examiner—Frank E. Werner
Assistant Examiner—Scott L. Lowe
Attorney, Agent, or Firm—Leydig, Voit & Mayer

[57] ABSTRACT

An electric power cord take-up reel having an external housing, a shaft mounted in the housing, and a spool journalled on the shaft for storing a length of electric power cord and spring-biased to rewind a length of cord previously withdrawn from the reel, and supplied with electric current from an external source through stator contacts in the housing and rotor contact rings on the spool. The reel includes an electric switch and a camming ratchet ring for interrupting the flow of current to the stator contacts while the cord is being withdrawn or retracted or is in its stored position on the spool. The camming ratchet ring is engageable with a latch pawl for locking the reel in a stationary position when a desired length of cord is withdrawn at which time the ring also activates the switch to energize the cord for use.

11 Claims, 9 Drawing Sheets

ELECTRIC POWER CORD TAKE-UP REEL WITH AUTOMATICALLY OPERATED LATCH PAWL ACTUATED SWITCHING MECHANISM

FIELD OF THE INVENTION

The present invention relates generally to cord reels, and more particularly to electric power cord take-up reels of the type in which an electric power cord may be withdrawn from the reel and automatically rewound onto the reel by virtue of a spring-biased rewind spool.

BACKGROUND OF THE INVENTION

Electric power cord take-up reels are known in which a cord wound on a spool may be withdrawn to a desired length by pulling on the cord with means provided to lock the spool with the cord withdrawn to the desired length. The reel includes an inlet cord that may be connected to an appropriate power source. Electrical communication between the inlet cord and the cord wound upon the spool is by means of a commutation mechanism which includes a stator having a plurality of contacts within the reel and concentric rings that are movable with the spool for sliding engagement with the stator contacts. A problem with such take-up reels is that if power is connected to the outlet cord as it is withdrawn, undesirable arcing can occur between the rotor rings and the stator contacts resulting in damage to the contacts.

OBJECTS AND SUMMARY OF THE INVENTION

It is the primary object of the present invention to provide an electric power cord take-up reel in which the flow of electric current to the cord is automatically and reliably interrupted when the cord is manually drawn from the reel and rewound thereon.

It is another object to provide such a power cord take-up reel in which the flow of current to the cord is interrupted when the cord is in its fully retracted position.

It is a further object to provide a power cord take-up reel as characterized above in which the flow of electric current to the cord is interrupted to prevent arcing between the electrical contacts inside the reel in order to substantially decrease pitting of the contacts in use and also to provide a safer, arc-free environment for operation of the take-up reel in potentially hazardous atmospheres.

A related object is to provide such an electric power cord take-up reel in which a single latching mechanism is adapted to lock the reel when the cord is manually drawn out to a desired length for use and to simultaneously activate the flow of electrical current to the cord when it is in its selectively locked position.

Yet another object is to provide a power cord take-up reel as described above which is relatively simple and inexpensive in construction as well as durable and trouble free in operation.

According to the present invention, an electric power cord take-up reel is provided including an exterior housing, a shaft mounted in the housing, a spool journalled on the shaft for storing a length of electric power cord wound on the spool, and a rewind spring biased to rotate the spool to rewind the free end of the cord previously withdrawn from the reel. The take-up reel also provides means for transmitting electric current from an external power source to the cord wound on the reel including stator contacts which engage complementary rotor rings secured to the spool. The take-up reel also includes a switching mechanism for interrupting the flow of current from the external power source to the stator contacts and the reel cord as the cord is being withdrawn and retracted from the reel and when the cord is fully retracted to its stored position within the reel. A latch pawl and camming ratchet ring are provided for locking the spool in a stationary position when the free end of the cord is withdrawn to a desired length and for activating current flow to the stator contacts and reel cord by engaging the switching mechanism when the spool is in the locked position.

These and other features and advantages of the invention will become more readily apparent upon reading the following description of a preferred exemplified embodiment of the invention and upon references to the accompanying drawings wherein:

DETAILED DESCRIPTION OF THE PREFERRED EMBODIMENTS

Figure 1:
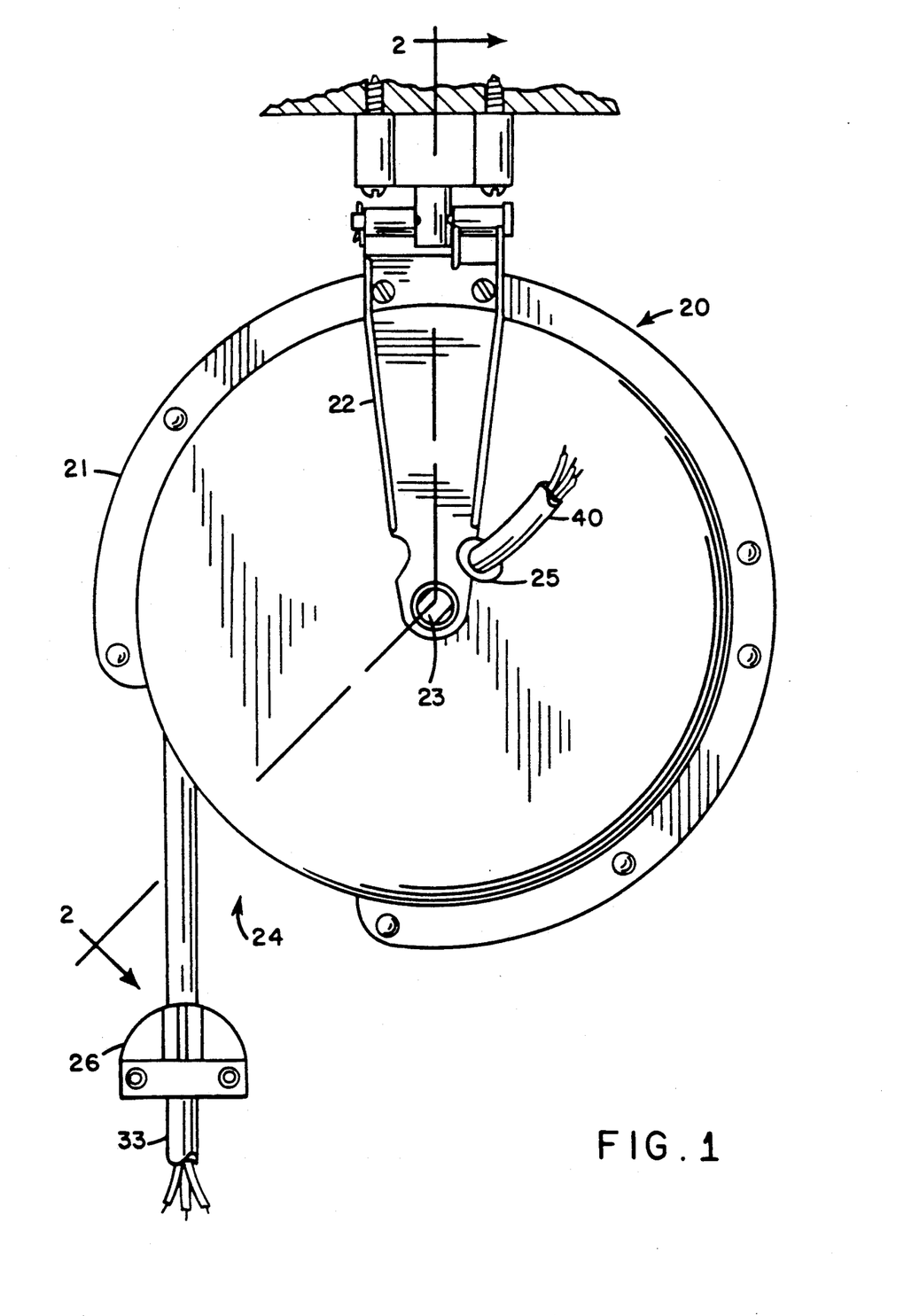
FIG. 1 is a side elevation view of the take-up reel of the present invention.
Figure 2:
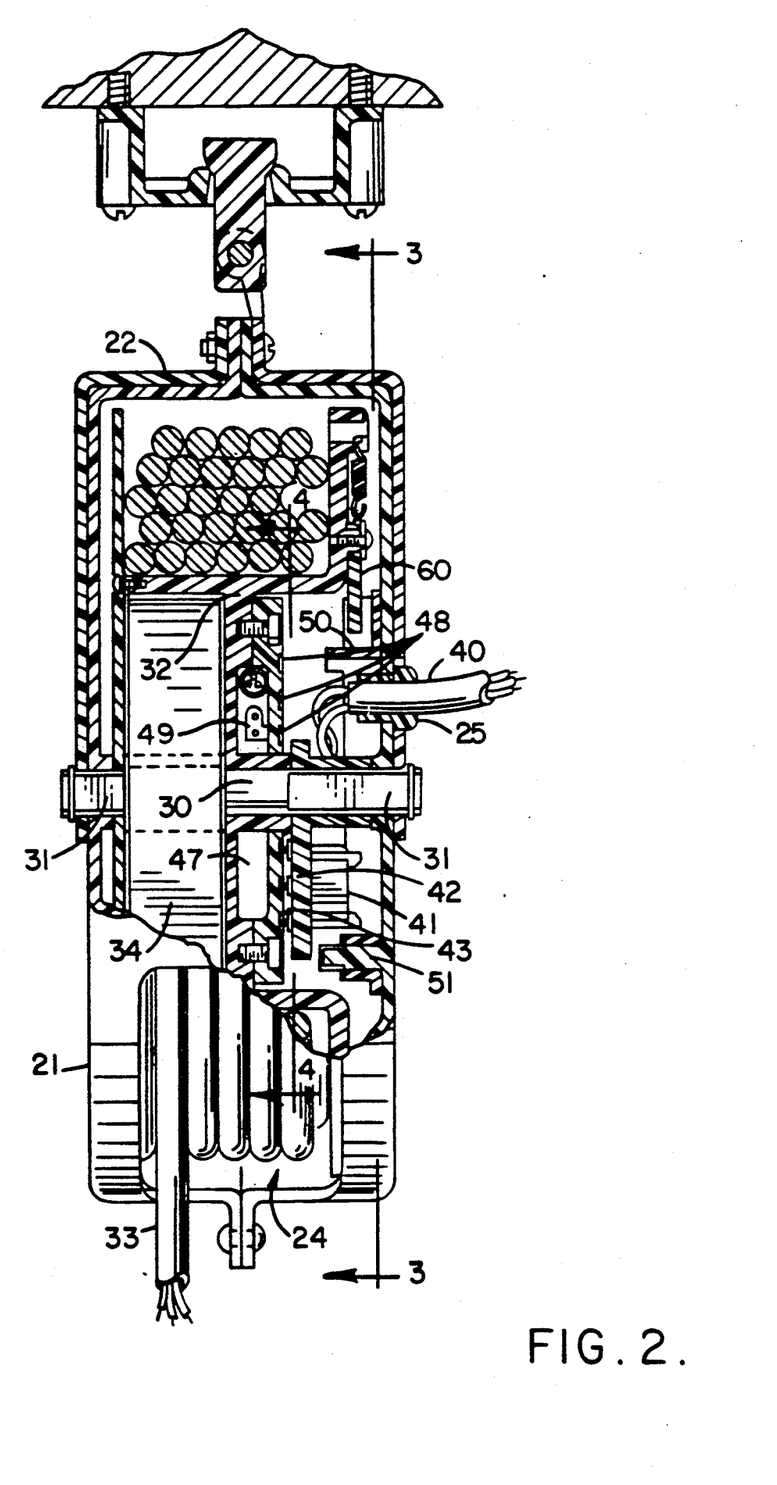
FIG. 2 is a front sectional view of the interior of the take-up reel.
Figure 3:
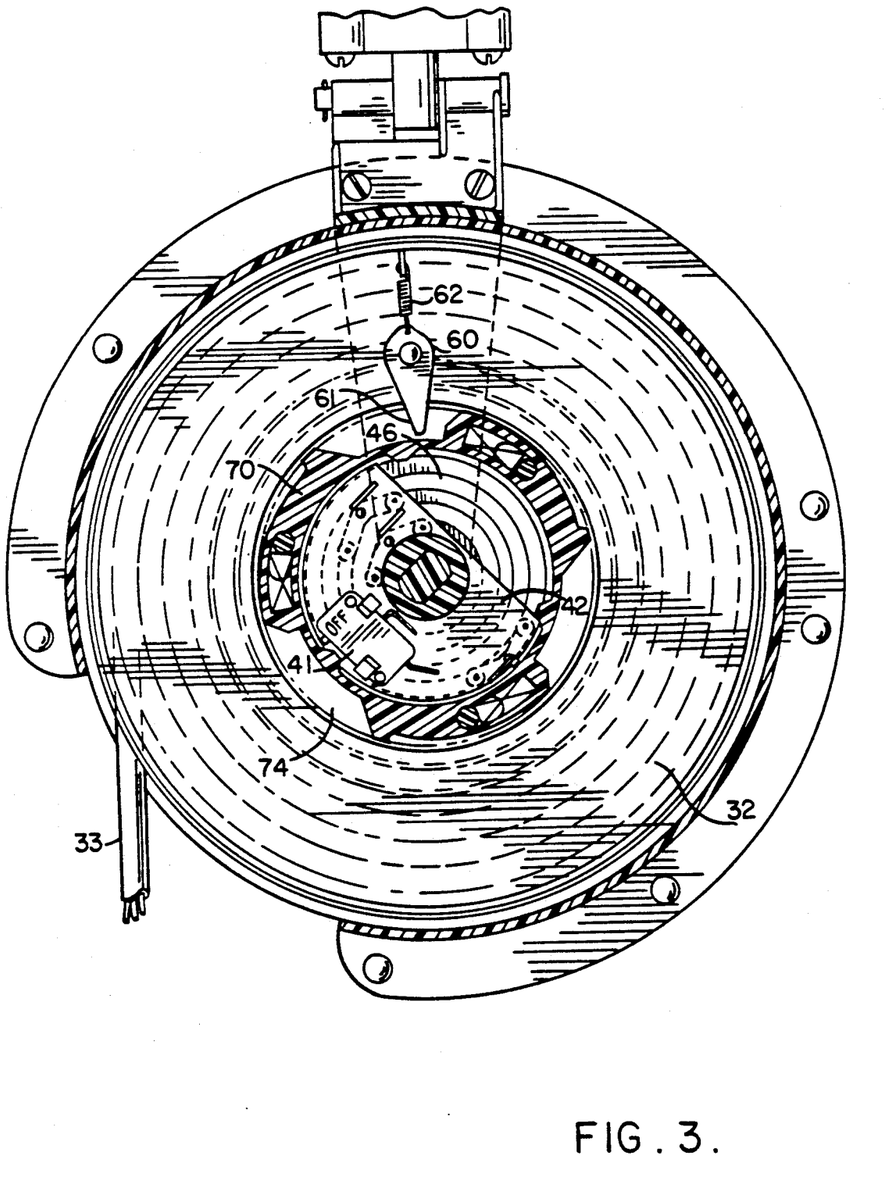
FIG. 3 is a side sectional view of the interior of the take-up reel.

Turning to the drawings, there is shown in FIG. 1 an electric power cord take-up reel 20 which includes an exterior housing 21 which surrounds and supports the inner parts of the reel and is attached to a mounting bracket 22 such that the take-up reel can be mounted to either a ceiling or a vertical wall. FIG. 2 illustrates the interior of the take-up reel which includes a shaft 30 preferably formed with non-circular end portions 31 such that the shaft is non-rotatably mounted in corresponding non-circular openings 23 located in the center of each side of the exterior housing 21. A spool 32 is journalled on the circular portion of the shaft 30 and a length of electric power cord 33 is wound on the spool 32. The exterior housing 21 contains an opening 24 for allowing the free end of the cord 33 to be withdrawn from the reel.

One important feature of the take-up reel of the present invention is to automatically rewind a length of cord withdrawn from the reel when its use is no longer desired. Thus, the take-up reel is provided with a rewind spring 34 which is connected to the shaft 30 and spool 32 and is biased to rotate the spool about the shaft in a direction for rewinding the cord on the spool. (Clockwise direction in the drawings.) It will be appreciated that the rewind spring 34 is pretensioned such that it will continue to exert its force on the spool even when the entire cord is rewound on the spool. If desired, a stopping device 26 is secured on the end of the cord to stop the rotation of the spool when the cord is fully rewound.

As is customary in such devices, the take-up reel is designed to receive its supply of electric current from an external power source. In the illustrated embodiment, the take-up reel is provided with an inlet supply cord 40 which extends out through a hole 25 in the exterior housing 21 to receive the supply of electric current from an external power source such as a conventional convenience outlet (not shown). To allow the flow of current from the inlet supply cord 40 to the reel cord 33, the inlet supply cord 40 is connected through an electric switch 41 to contacts 43 mounted on a stator 42. The electric switch 41 is selectively engageable to either allow or interrupt the flow of current from the supply cord 40 to the stator contacts 43.

Figure 4:
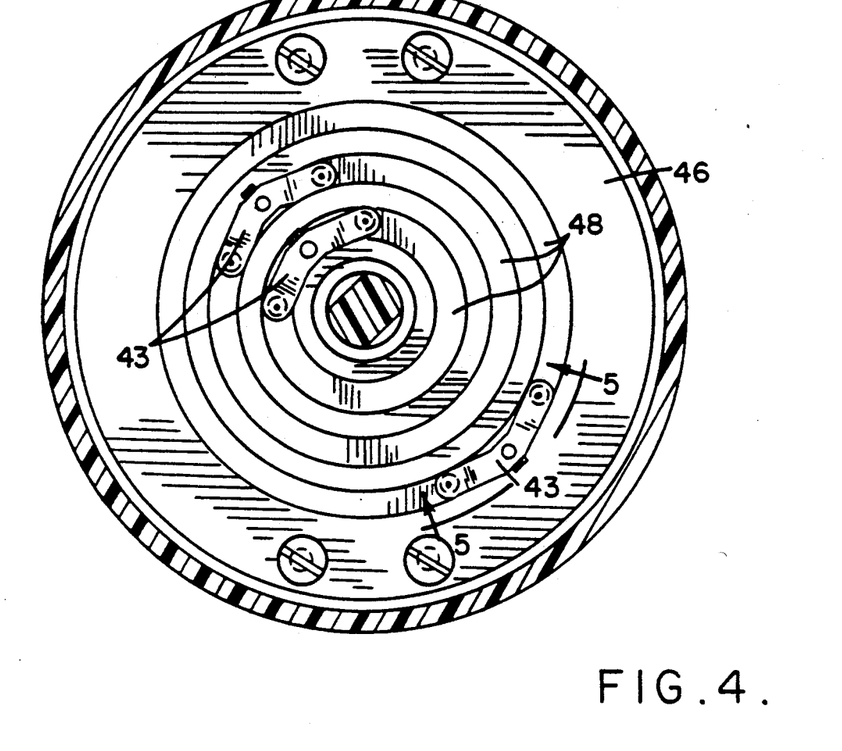
FIG. 4 is side sectional view of the rotor rings and the stator contacts.
Figure 5:
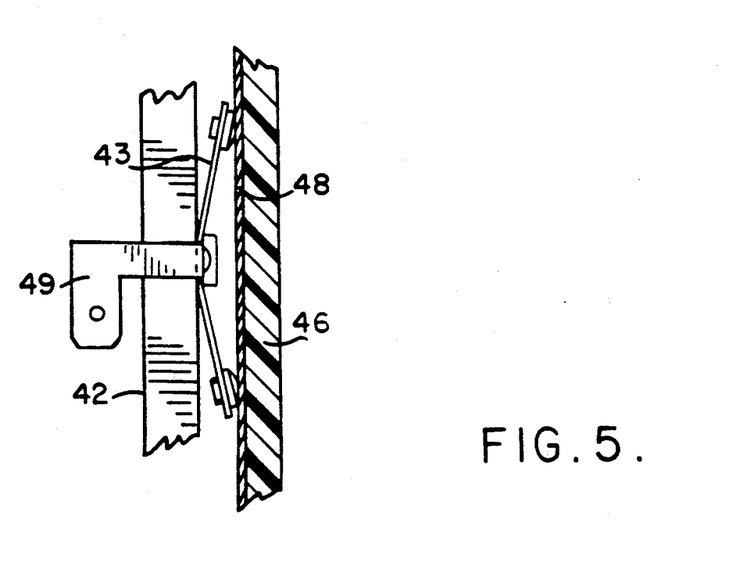
FIG. 5 is a fragmentary enlargement of a stator contact and rotor ring.
Figure 6:
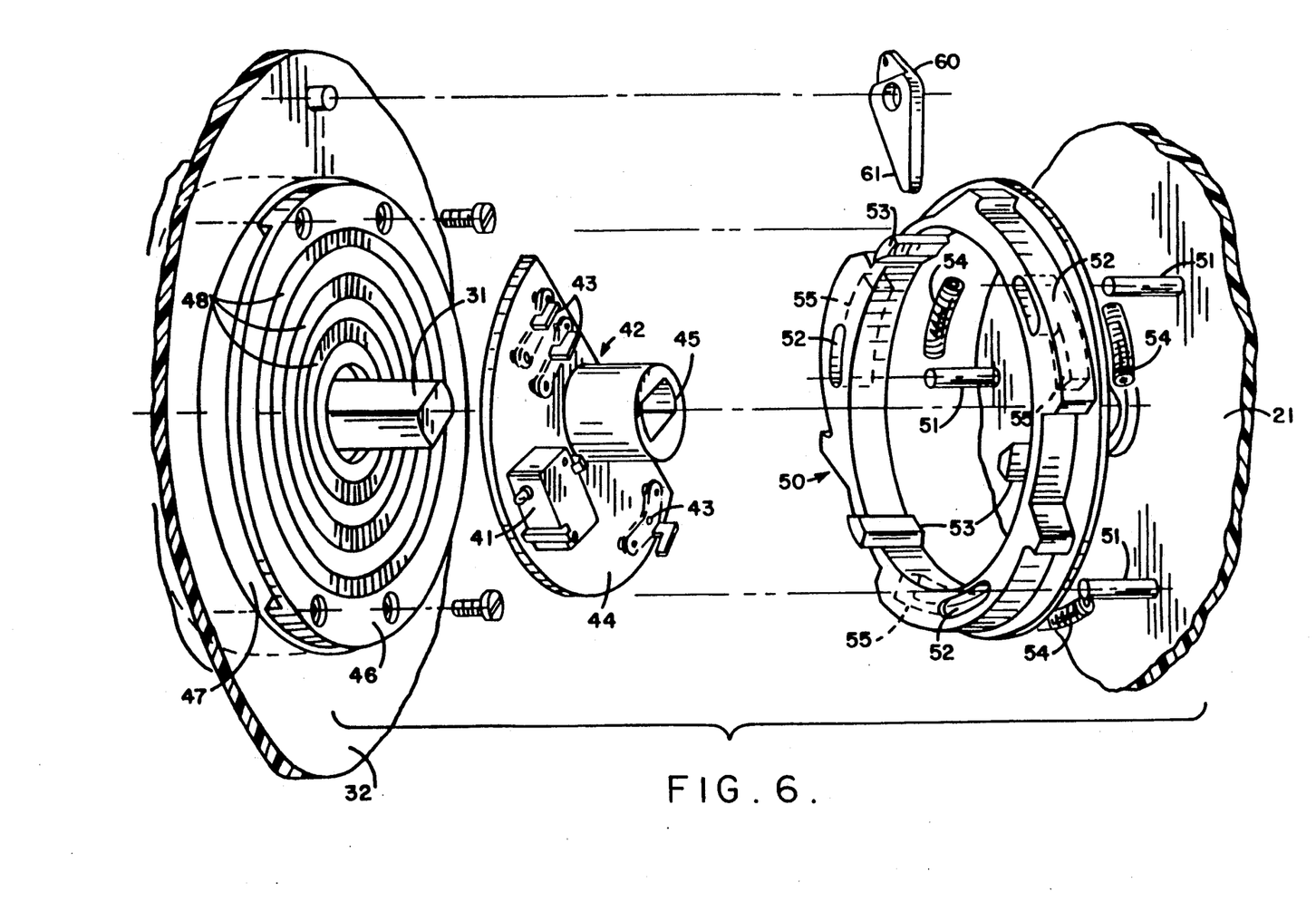
FIG. 6 is a fragmentary view illustrating the assembly of the main operational parts of the take-up reel.

As shown in FIG. 6, the stator 42 includes a substantially semicircular plate 44 which supports the stator contacts 43 and the switch 41 and a generally centrally located, non-circular aperture 45 adapted to fit on the non-circular portion 31 of the shaft 30 to keep the stator stationary. Adjacent to the stator 42 and axially inward on the shaft 30, a circular rotor plate 46 is journalled on the circular portion of the shaft and secured to the radially inner portion of the spool 32 such that a gap 47 exists between the inner sections of the rotor and spool. As shown in FIGS. 4 and 5, the rotor 46 contains concentric metal rings 48 which engage the stator contacts 43 to transmit current from the external power source to the reel cord 33. The inner end of the reel cord 33 is connected to the rotor rings 48 through rotor contacts 49 which extend into the gap 47 between the spool and rotor.

In accordance with an important feature of the present invention, the flow of current to the stator contacts 43 and the reel cord 33 is automatically interrupted when the free end of the cord is being withdrawn or retracted or when the cord is fully retracted to its stored position within the reel. To facilitate this current interruption, a camming ratchet ring 50 is provided which is selectively engageable with the electric switch 41 such that the camming ratchet ring is biased to a switch deactivating position during rotation of the spool as the cord is withdrawn or retracted or when the cord is fully retracted in its stored position.

In the illustrated embodiment, the camming ratchet ring 50 includes a generally circular ring which is mounted on a plurality of pegs 51 that extend transversely inward from the exterior housing to fit in complementary arcuate slots 52 which are circumferentially spaced around the ring. The camming ratchet ring 50 is centrally located within the reel such that it surrounds the outer edge of the stator 42. To selectively engage the switch 41 on the stator, the ring 50 contains a plurality of switch activating lobes 53 which extend radially inward and are positioned such that one of the lobes is adjacent the switch.

To interrupt the flow of current to the stator contacts 43, return springs 54 are disposed between the mounting pegs 51 and one end of the arcuate ring slots 52 to bias the ring to a switch deactivating position in which the lobe does not engage the switch. In the illustrated embodiment, the return springs 54 are compression springs placed within extensions 55 of the ring slots 52. It will be appreciated that in an alternative arrangement, the return springs could be tension springs secured to the other side of the mounting pegs and ring slots biased to pull the ring toward the switch deactivating position. FIGS. 3, 7, 8 and 10 illustrate the camming ratchet ring 50 in its normal switch deactivating position.

In keeping with this aspect of the invention, interrupting the flow of electric current to the stator contacts during the withdrawal or retraction of the free end of the reel cord precludes the possibility of electrical arcing between the stator contacts and the rotating rotor rings. Eliminating the occurrence of electrical arcing greatly decreases pitting of the stator contacts and thus substantially increases the durability and working life of the contacts. Additionally, the prevention of electric arcing provides a safer environment for operation of the take-up reel in potentially hazardous atmospheres where sparking or electric arcing could lead to disastrous consequences.

Pursuant to another feature of the invention, the camming ratchet ring 50 and a latch pawl 60 are provided to facilitate the locking of the reel spool 32 when the free end of the cord has been withdrawn to a desired length. In the illustrated embodiment, the latch pawl 60 is pivotally mounted on the radially outer portion of the spool and is provided with a biasing spring 62 to position the latch pawl substantially in radial alignment such that the inner nose 61 of the latch pawl extends radially inward to engage the camming ratchet ring 50. The outer periphery of the camming ratchet ring 50 includes a plurality of external ratchet tooth sections 70 circumferentially spaced around the ring with corresponding neutral recesses 74 adjacent the ratchet tooth sections. Both ends 71a and 71b of each ratchet tooth section are inclined to facilitate the pivoting of the latch pawl 60 away from its normal radially oriented position.

Figure 7:
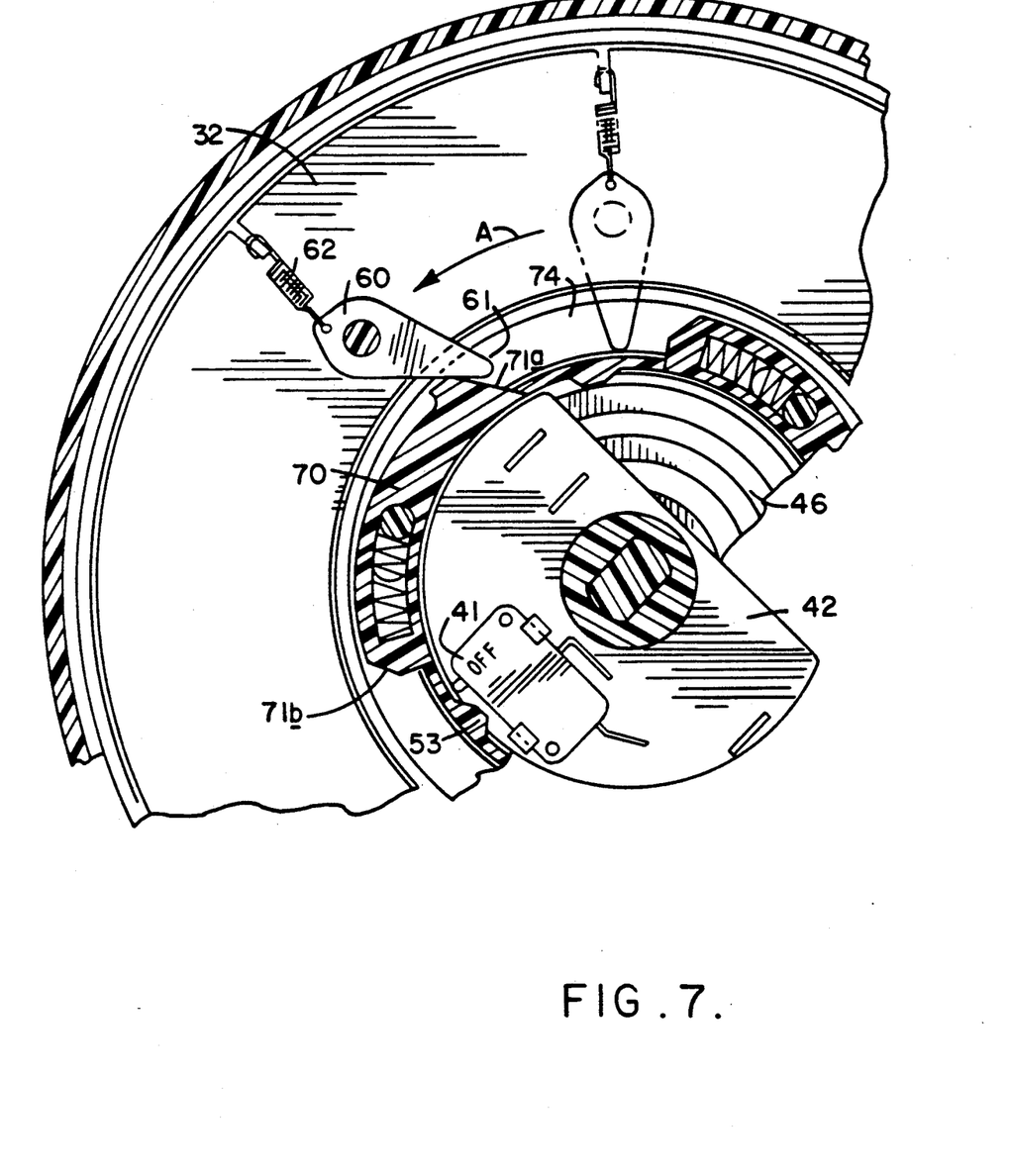
FIG. 7 is a fragmentary side sectional view illustrating the rotation of the spool as the reel cord is withdrawn.
Figure 8:
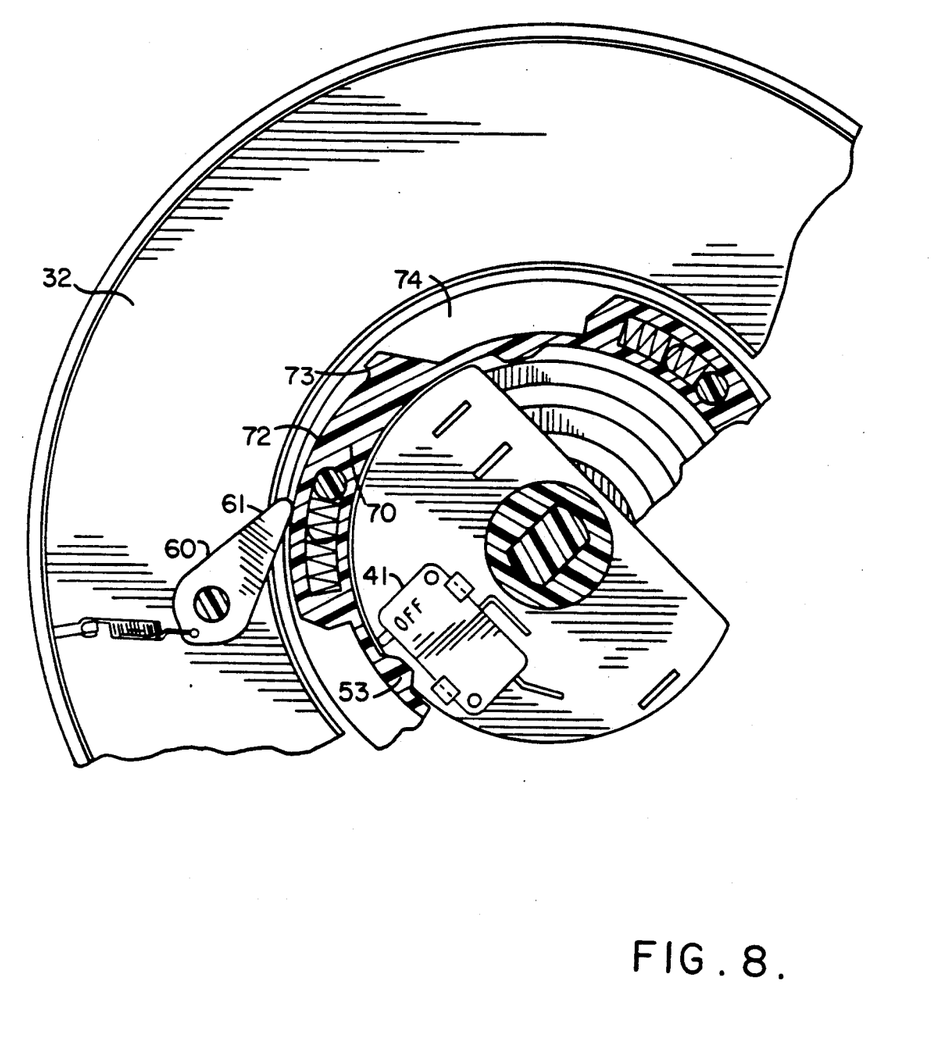
FIG. 8 is a fragmentary side sectional view illustrating the initial step of the spool-locking operation, stopping the rotation of the spool while the latch pawl is on the locking ramp.

In order to lock the spool, the free end of the cord is first withdrawn to a desired length. FIG. 7 illustrates the rotation of the spool in the direction of arrow A as the cord is withdrawn. As shown here in the solid line illustration, the inner nose 61 of the latch pawl 60 intermittently strikes the inclined faces 71a at the tooth sections 70 and rides over the teeth 70. To initiate the locking of the spool, the cord is manually withdrawn to a desired length and stopped when the latch pawl 60 is on the shallow depth locking ramp 72 of the ratchet tooth section 70 as shown in FIG. 8. The cord is then released resulting in rotation of the spool in the opposite direction under the force of the rewind spring. As the spool rotates in the opposite direction (i.e. in the direction of arrow B in FIG. 9), the inner nose of the latch pawl is guided along the locking ramp 72 to engage the ratchet tooth protrusion 73 at the end of the tooth section to lock the spool in place.

Figure 9:
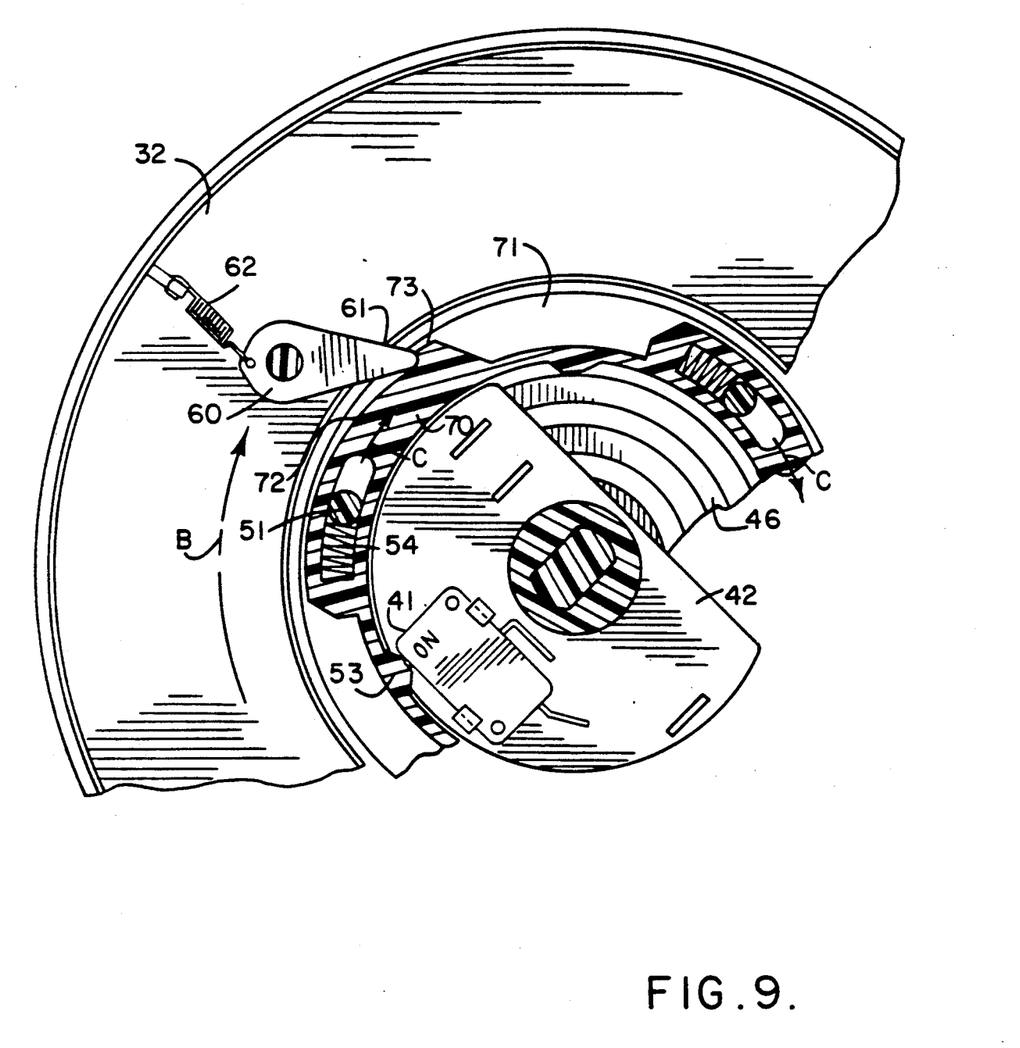
FIG. 9 is a fragmentary side sectional view illustrating the locking of the spool and the simultaneous activating of the switch to the "on" position to allow the flow of current to the reel cord.

In accordance with another feature of the invention, in addition to locking the spool with the power cord withdrawn to the specified desired length, means are provided to simultaneously activate the switch 41 to supply current to the cord. Accordingly, when the latch pawl 60 engages the ratchet tooth 73, as described above, the force of the rewind spring is sufficient to overcome the biasing force of the return springs 54 on the camming ratchet ring 50 and the ring is rotated through its arcuate slots 52. As the ring is rotated the limited distance of the slots, one of the switch activating lobes 53 located on the inner perimeter of the ring adjacent the switch 41 rotates to cam the switch to the "on" position thus activating the flow of current to the cord. As shown in FIG. 9, arrow B indicates rotation of the spool 32 under the force of the rewind spring and arrow C shows the rotation of the camming ratchet ring 50 through its slots to a switch activating position. When the camming ratchet ring has rotated completely through its slots, the spool is now locked in place and the cord is energized for use.

Figure 10:
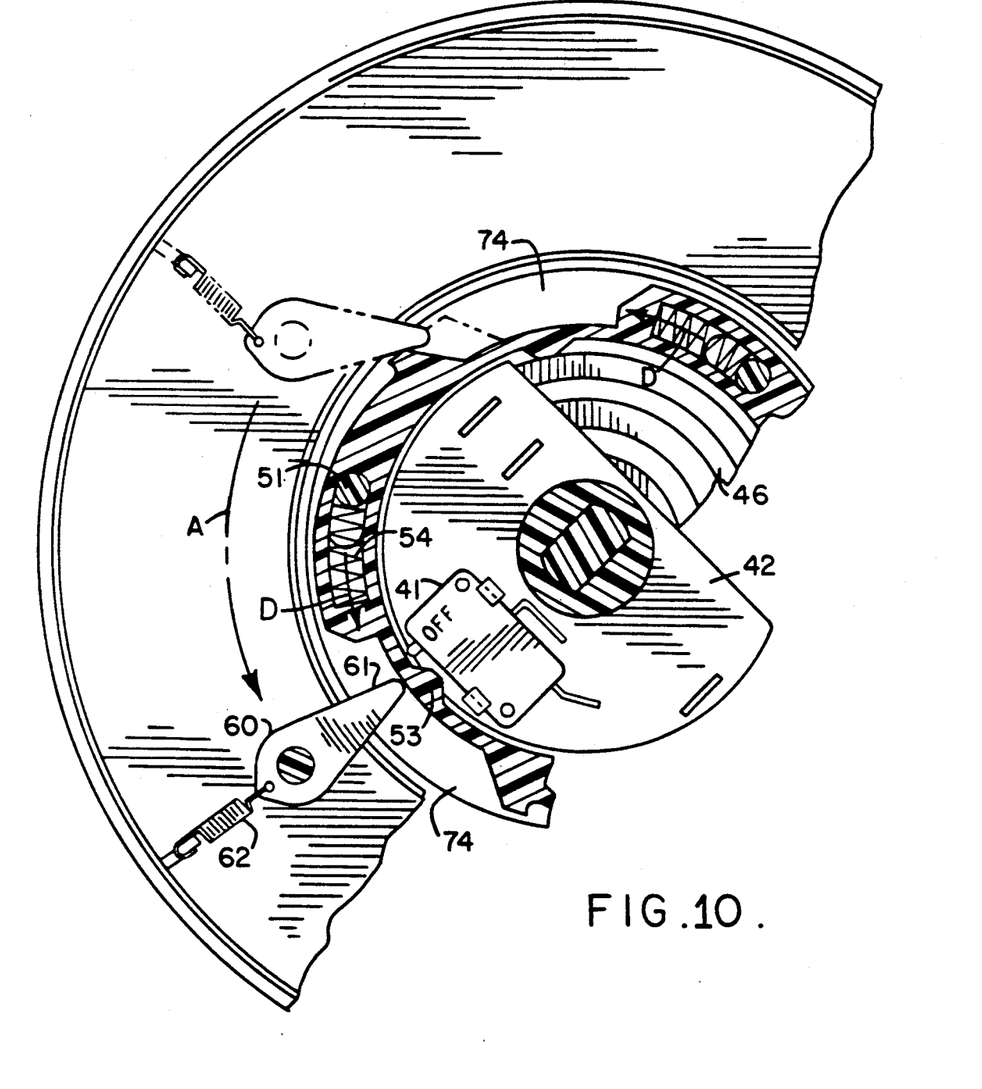
FIG. 10 is a fragmentary side sectional view illustrating the unlocking of the spool and simultaneous deactivating of the switch to the "off" position. The dashed lines show the latch pawl and ratchet tooth in the locked position while the solid lines of the latch pawl and ratchet tooth show the subsequent rotation of the spool to place the latch pawl in a neutral position for rewind.

In further keeping with the invention, after the use of the cord at its specified withdrawn length is terminated, means are provided to deactivate the switch and rewind the cord on the spool. In order to release the reel from its locked position and to deactivate the switch to interrupt the flow of current, it is necessary to first manually withdraw the cord a short distance so that the latch pawl 60 is pivoted to a substantially radially oriented position adjacent one of the neutral recesses 74 of the camming ratchet ring 50. Initially, the counterclockwise rotation of the cord spool 32 and the latch pawl 60 is accompanied by the simultaneous counterclockwise rotation of the camming ratchet ring under the force of the return springs 54 to its switch deactivating position. In FIG. 10, the dashed lines show the latch pawl and ratchet tooth in the locked position and the solid lines illustrate the subsequent counterclockwise rotation (arrow A) of the latch pawl to a neutral recess as the cord is further withdrawn a short distance and the accompanying rotation (arrow D) of the camming ratchet ring to a normal switch deactivating position.

Once the latch pawl reaches a neutral recess 74, its biasing spring 62 pivots the latch pawl to a neutral, radial position and the cord can now be released to begin rewinding of the cord. As the cord is automatically retracted under the force of the rewind spring, the latch pawl rotates with the spool and intermittently contacts the ratchet tooth sections of the ring and is pivoted to a non-locking position where the inner nose of the latch pawl slides over the ratchet tooth rather than engaging it thus allowing for the complete retraction of the cord to its stored position on the spool. It is understood that during the retraction of the cord to its stored position and when the cord is in its fully wound position, the camming ratchet ring is biased to its normal switch deactivating position so that no current flows to the stator contacts and the cord.

From the foregoing, it will be appreciated that the present invention provides an electric power cord take-up reel for automatically retracting the free end of the cord previously withdrawn from the reel to which electric current is supplied from an external power source. The cord is stored on a spool which is journalled on a shaft mounted in the housing and a rewind spring is provided for retracting the cord. During withdrawal and retraction of the cord from the reel and when the cord is fully stored within the reel, the supply of current to the electrical contacts within the reel is interrupted by a selectively engageable switch to prevent the flow of current to the cord. A locking mechanism including a latch pawl and camming ratchet ring is provided to lock the cord at a desired length when withdrawn for use and to simultaneously activate the switch to energize the cord.

We claim as our invention:

1. A take-up reel for automatically retracting a free end of an electric power cord supplied with current from an external power source comprising in combination, a reel housing, a shaft mounted in said housing, a spool journalled on said shaft for storing a length of electric power cord wound on the spool, a rewind spring attached to the spool and the shaft and biased to rotate the spool to rewind the free end of the cord previously withdrawn from the reel, means including a plurality of concentric rotor rings secured to the spool for transmitting electric current to the cord wound on the reel, means including a stator secured within the housing and carrying a plurality of electrical contacts respectively engaging the rotor rings for transmitting electric current thereto from the external power source, means for interrupting the flow of electric current from the external power source to at least one of the stator contacts and the cord as the free end of the cord is being withdrawn and retracted from the reel and when the cord is fully retracted to its stored position within the reel, said current interrupting means including an electric switch mounted within said housing an a camming ratchet ring mounted for limited rotation about said housing shaft adjacent said switch, said camming ratchet ring including a switch activating lobe selectively engageable with said switch, and means for biasing the camming ratchet ring toward a switch deactivating position so that the flow of current to the reel cord is normally interrupted, and means for locking the spool in a stationary position when the free end of the cord is withdrawn to a desired length and tension on the free end thereof is relieved, said locking means being disposed to engage and rotate said ratchet ring through said limited rotation so as to bring said cam lobe into operative engagement with said switch for actuating current flow to said stator contacts and the cord when the spool is locked in said stationary position.

2. A take-up reel as defined in claim 1 wherein said housing includes at least one peg and said camming ratchet ring includes at least one complementary arcuate slot, said camming ratchet ring being mounted in said housing with said peg fitted into said complementary arcuate slot, and said biasing means includes a return spring secured between said peg and one end of said complementary arcuate slot to bias the camming ratchet ring toward said switch deactivating position.

3. A take-up reel as defined in claim 1 wherein said camming ratchet ring has a plurality of external teeth formed on the outer periphery thereof and a latch pawl having an inner nose is pivotally mounted on the exterior of the spool, the latch pawl being normally biased to a generally radially inwardly extending position such that the inner nose of the latch pawl contacts the external teeth of the camming ratchet ring as the latch pawl rotates with the spool around the camming ratchet ring.

4. A take-up reel as defined in claim 3 wherein the outer periphery of the camming ratchet ring also contains a shallow depth locking ramp leading to each ratchet tooth such that when the free end of the cord is withdrawn to a desired length and the latch pawl is pivoted to rest on the locking ramp, the subsequent release of the cord results in the rotation of the spool in the opposite direction under the force of the rewind spring and the latch pawl is guided on the locking ramp to engage the ratchet tooth and lock the spool in said stationary position.

5. A take-up reel as defined in claim 4 wherein the force of the rewind spring is selected such that when the latch pawl engages a ratchet tooth to lock the spool in position, the rewind spring overcomes the biasing force on the camming ratchet ring to rotate the ring through said limited rotation and said activating lobe of the camming ratchet ring engages and activates the electrical switch to initiate the flow of current to the reed cord as the spool is locked in said stationary position.

6. A take-up reel as defined in claim 4 including means for pivoting the latch pawl to a non-locking position to allow the inner nose of the latch pawl to slide over the ratchet teeth on the outer periphery of the camming ratchet ring during rewind of the reel cord.

7. A spool lock and current interrupting device for an electric power cord take-up reel having a housing and a shaft rotatably mounting a spring biased storage and return spool for the cord supplied with electric current from an external source through stator contacts in the housing and rotor contact rings on the spool, said device comprising, in combination, a normally open switch mounted in the housing and connected in series between one of the stator contacts and the external source of electric current, a toothed camming ratchet ring mounted for limited rotation within the housing and having a cam lobe disposed for operative engagement with said switch incident to said limited rotation, means for normally biasing said camming ratchet ring out of engagement with said switch, and a locking pawl pivotally mounted on the spool and disposed to engage one of said ratchet teeth and to rotate said ratchet ring through said limited rotation so as to bring said cam lobe into operative engagement with said switch and thereafter preclude further rotation of said spring biased storage and return spool when tension on the end of the power cord withdrawn from the reel is relieved.

8. A device as defined in claim 7 wherein said camming ratchet ring includes a plurality of arcuate slots disposed on mounting pegs within the housing and said means for biasing said camming ratchet ring includes return springs disposed between the pegs and one end of the slots to bias the ring to a position out of engagement with the switch.

9. A device as defined in claim 8 including means for pivoting the locking pawl to a non-locking position to allow an inner nose of the latch pawl to slide over the ratchet teeth on the camming ratchet ring during rewind of the reel.

10. A take-up reel as defined in claim 8 wherein the outer periphery of the camming ratchet ring also contains a shallow depth locking ramp leading to each ratchet tooth such that when the free end of the cord is withdrawn to a desired length and the latch pawl is pivoted to rest on the locking ramp, the subsequent release of the cord results in the rotation of the spool in the opposite direction under the force of the rewind spring and the latch pawl is guided on the locking ramp to engage the ratchet tooth and lock the spool in said stationary position.

11. A take-up reel as defined in claim 10 wherein the force of the rewind spring is selected such that when the latch pawl engages a ratchet tooth to lock the spool in position, the rewind spring overcomes the biasing force on the camming ratchet ring to rotate the ring through said limited rotation and said activating lobe of the camming ratchet ring engages and activates the electrical switch to initiate the flow of current to the reel cord as the spool is locked in said stationary position.

* * * * *